(12) United States Patent
Smyth et al.

(10) Patent No.: US 7,779,023 B2
(45) Date of Patent: Aug. 17, 2010

(54) INTELLIGENT INTERNET WEBSITE WITH HIERARCHICAL MENU

(75) Inventors: Barry Joseph Smyth, Dublin (IE); Paul Cotter, Dublin (IE); Elizabeth Ann McKenna, Mullagh (IE); Nigel David Hanby, Dublin (IE)

(73) Assignee: Amdocs Software Systems Limited, Dublin 3 (IE)

( * ) Notice: Subject to any disclaimer, the term of this patent is extended or adjusted under 35 U.S.C. 154(b) by 0 days.

(21) Appl. No.: 10/143,135

(22) Filed: May 10, 2002

(65) Prior Publication Data

US 2003/0065706 A1 Apr. 3, 2003

(30) Foreign Application Priority Data

May 10, 2001 (IE) .............................. S2001/0455

(51) Int. Cl.
*G06F 7/00* (2006.01)
*G06F 17/30* (2006.01)
(52) U.S. Cl. ...................... 707/765; 707/767; 715/744; 715/765
(58) Field of Classification Search ............... 707/1–10, 707/100–104.1, 200–206, 600–831; 715/513–514, 715/733–748, 760–765, 807, 810–813, 853–855; 709/223–224
See application file for complete search history.

(56) References Cited

U.S. PATENT DOCUMENTS

| | | | | |
|---|---|---|---|---|
| 5,630,125 | A * | 5/1997 | Zellweger ................ | 707/103 R |
| 5,835,905 | A * | 11/1998 | Pirolli et al. .................... | 707/3 |
| 6,144,962 | A * | 11/2000 | Weinberg et al. ............. | 707/10 |
| 6,154,750 | A * | 11/2000 | Roberge et al. .......... | 707/104.1 |
| 6,489,968 | B1 * | 12/2002 | Ortega et al. ................ | 715/713 |
| 6,826,553 | B1 * | 11/2004 | DaCosta et al. ................ | 707/1 |
| 6,832,350 | B1 * | 12/2004 | Bates et al. .............. | 715/501.1 |
| 6,981,037 | B1 * | 12/2005 | Srikant et al. ............... | 709/223 |
| 7,028,261 | B2 * | 4/2006 | Smyth et al. ................. | 715/744 |

FOREIGN PATENT DOCUMENTS

WO    WO 00/04474    1/2000

(Continued)

OTHER PUBLICATIONS

Franca Garzotto et al., Navigation patterns in hypermedia data bases, IEEE, 370-379.*

(Continued)

*Primary Examiner*—Jean B Fleurantin
(74) *Attorney, Agent, or Firm*—Zilka-Kotab, PC

(57) ABSTRACT

An internet website which presents a hierarchical menu structure to users includes a personalization engine 14 to automatically modify the menu structure for each user at least according to that user's previous browsing history at the site. In one embodiment the engine 14 provides, as menu options for a selected menu page of the hierarchical menu, a plurality of the most probable links which the user may wish to reach from the selected menu page. In another embodiment there are provided, as additional menu options for a particular menu page, a plurality of links which are similar, as determined by meeting a predetermined similarity metric, to menu options present on the particular menu page other than through meeting the similarity metric.

6 Claims, 10 Drawing Sheets

FOREIGN PATENT DOCUMENTS

| | | |
|---|---|---|
| WO | WO 00/17792 | 3/2000 |
| WO | WO 00/65773 | 11/2000 |
| WO | WO 01/22245 A1 | 3/2001 |
| WO | WO 01/96994 A2 | 12/2001 |

OTHER PUBLICATIONS

Gustavo Rossi et al., User interface patterns for hypermedia applications, May 2000, ACM, 136-142.*

Bettina Berendt et al., Analysis of navigation behaviour in web sites integrating multiple information systems, Mar. 2000, ACM, 56-75.*

Balabanovic, M. et al., "Fab: Content-Based, Collaborative Recommendation", *Communications of the ACM*, Mar. 1997, 40(3), pp. 66-72.

Sarwar, B. et al., "Item-based Collaborative Filtering Recommendation Algorithms", *GroupLens Research Group/Army HPC Research Center, Department of Computer Science and Engineering, University of Minnesota*, Minneapolis, MN 55455, May 2001, Submitted to the WWW 10 Conference, pp. 1-16.

Smyth, B. et al., "Personalized Electronic Program Guides for Digital TV", *AI Magazine(American Association for Artificial Intelligence)*, 2001, 22(2), pp. 3, 89-98.

Fu, X. et al., "Mining Navigation History for recommendation", *International Conference on Intelligent User Interfaces*, 2000, 106-112, XP 001168645.

Pilgrim, C.J. et al., "Designing WWW Site Map Systems", *IEEE Computer Society*, 1999, 253-258, XP 010352425.

Smyth, B. et al., "Surfing the Digital Wave Generating Personalised TV Listings using Collaborative, Case-Based Recommendation", *Case-Based Reasoning Research and Development, International Conference*, 1999, 561-571, XP-000997650.

* cited by examiner (a) Creating a new menu page.

(b) Creating a new link page from a menu.

(c) Specify personalisation properties

Specify personalisation properties

FIG. 5

Parent-child Table

| A | B D C |
|---|---|
| | |

Child-parent Table

| B | A |
|---|---|
| D | A |
| C | A |

- e-merge home
  - Millionaire
  - New+Cool
    - Millionaire
    - FLC Competition
    - World Weather
    - Eircell Roaming
    - Aircoach
  - E-mail + Org
    - Messenger
    - WAP Mail
    - Euro Converter
    - eSearch
    - Find URL
  - News+Sport
    - Irish Times Breaking News
    - Sport
      - Irish Times Sport
      - Sky Sports News
      - Soccer
        - Sky Soccer Customize
FLC Competition
Menu option (b)

customise FLC Competition by choosing a menu which it should appear on.

Default
Trash
e-merge home
New+Cool    Submit

FIG. 6

| M1 | |
|---|---|
| Users | Hits |
| User1 | 10 |
| User6 | 50 |
| User8 | 20 |

Fig. 13

| M1 | |
|---|---|
| User | Hits |
| User1 | 10 |
| User5 | 20 |
| User11 | 15 |

| M2 | |
|---|---|
| User | Hits |
| User1 | 5 |
| User5 | 16 |
| User11 | 45 |

Fig. 14

| X | Y |
|---|---|
| 10 | 5 |
| 20 | 16 |
| 15 | 45 |

Fig. 15

| M1 | |
|---|---|
| Menu Options | Affinity |
| M2 | 0.266 |
| M3 | 0.63 |
| M4 | 0.2 |
| M7 | 0.09 |
| M11 | 0.5 |
| M20 | 0.01 |

Fig. 16

INTELLIGENT INTERNET WEBSITE WITH HIERARCHICAL MENU

This invention relates to an internet website, and is especially relevant to an internet website of the kind generally known as a portal or gateway, which is a website that is or proposes to be a starting site for users when they first connect to the internet. Examples of major internet portals are Yahoo, Excite and Netscape.

Internet sites or services almost always present a hierarchical menu structure to users. As is well understood, a hierarchical menu structure is one comprising a top level menu page, usually the home page of the portal, having links (selectable menu options) to a plurality of sub-pages each being either a further menu page or a "link" page (i.e. a page of ultimate interest to the user and containing no further menu options of the portal's menu structure). Each further menu page itself has further menu options to a plurality of further sub-pages each of which may be a yet further menu page or a further link page, and so on to the lowest level of the hierarchy which will all be link pages. It is to be noted that a link page may itself contain menu options, for example, if the link page is the home page of a financial website that may have its own menu structure, but these are not under the control of the operator of the internet site and are not considered part of its menu structure.

A problem with existing portals is that the menu structure is fixed. This means that a user may have to "drill down" through several menus and sub-menus to arrive at a link page of interest, and however often the user accesses that page he will always have to go through that process. Of course, where possible a user can "bookmark" the relevant page for direct access, but he may not always remember to do that and bookmarking may not be available on some WAP devices. In any event, the bookmarking of individual pages does not override the fixed menu structure, which overall may not coincide with the desired browsing habits of the user.

The problem is exacerbated as we move towards the wireless internet and mobile information access. New devices such as mobile phones are limited in terms of their functionality and screen-sizes and this ultimately limits their usefulness as information access devices. For example a mobile phone can have a screen size that is 200 times smaller than a typical PC screen, offering the user a narrow access window over the information space, and making it all the more important that every pixel of screen space is used to carry relevant information to end-users. In short, ensuring that mobile users gain access to the right information at the right time, both quickly and easily, is key to the future success of the mobile/wireless information revolution, including the current generation of WAP-enabled services and the next generation of 3G information services.

A traditional WAP portal provides the user with a predefined set of navigation menus to bring the user from the home page to their information goal, be it cinema or TV listings, news and weather, etc. The problem as it exists at the moment is that each user is presented with the same front-end and typically must follow a sequence of scrolls and clicks in order to locate their desired information—a "one size fits all" navigation solution. It is an object of the invention to overcome or mitigate this problem.

Accordingly, the invention provides an internet website which presents a hierarchical menu structure to users, the site having a default menu structure and means to automatically modify the default menu structure for each user over time according to at least that user's previous browsing history at the site.

The invention further provides a method of operating an internet website which presents a hierarchical menu structure to users, the method including automatically modifying a default menu structure for each user according to at least that user's previous browsing history at the site.

The invention further provides a computer program for use at an internet website which presents a hierarchical menu structure to users, the method including automatically modifying a default menu structure for each user according to at least that user's previous browsing history at the site.

While of primary utility in respect of WAP-enabled portals, the invention is applicable to Internet portals in general.

Embodiments of the invention will now be described, by way of example, with reference to the accompanying drawings, in which:

FIGS. 1(*a*) to 1(*e*) show the sequence of user actions required to access a particular item of information on a WAP phone according to the prior art;

FIGS. 2(*a*) and 2(*b*) show the sequence of user actions required to access the same item of information on the WAP phone from a WAP portal embodying the invention;

FIG. 5 are screen shots illustrating the use of the menu manager to create and configure new pages for personalisation;

FIG. 6 are screen shots illustrating the use of the customisation engine of FIG. 3;

FIG. 11 are child-parent and parent-child tables;

FIGS. 13 to 18 are various tables which illustrate the operation of the second embodiment.

Figure 1:
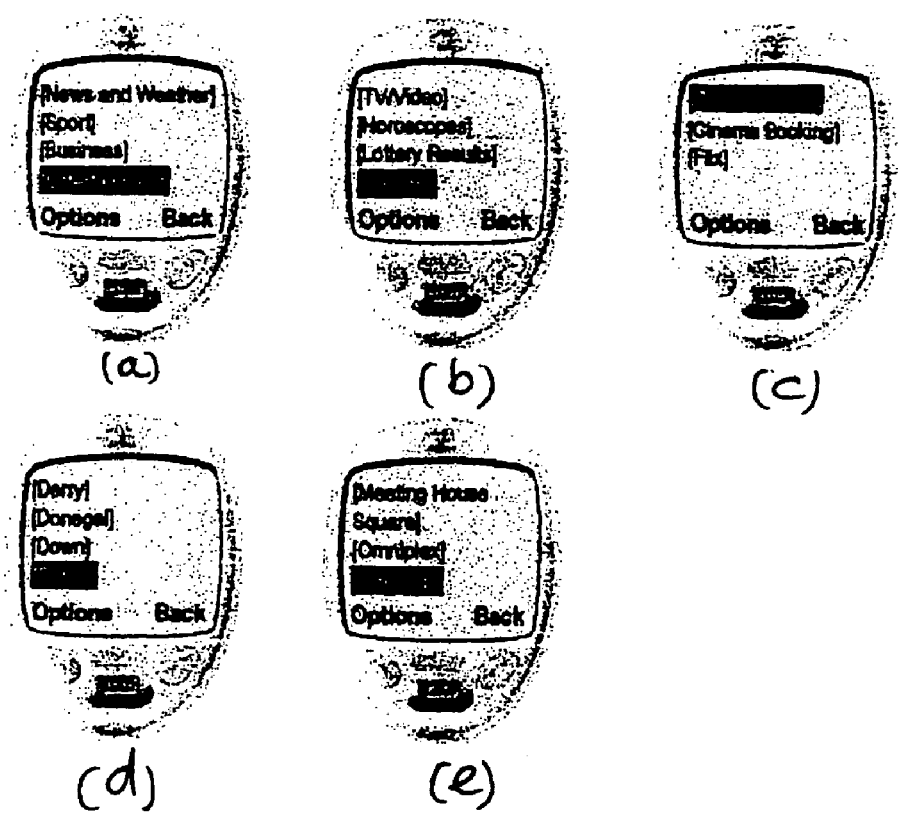

In order to better understand and appreciate the problem addressed by the embodiments of the invention, consider the simple example of the use of a WAP phone shown in FIG. 1. In order to access today's cinema listings in their local cinema (the Ormonde cinema in Stillorgan, Dublin) a user must take the following sequence of actions:

FIG. 1(*a*): scroll and select the [Entertainment] option on the home menu (option 7).

FIG. 1(*b*): scroll and select the [Cinema] option on the entertainment menu (option 4)

FIG. 1(*c*): select the [Cinema Times] option in the cinema menu (option 1)

FIG. 1(*d*): scroll and select [Dublin] (option 9)

FIG. 1(*e*): finally, select [Ormonde] (option 8)

This is indicative of a typical user session on current WAP portals and even though this user may query the Ormonde cinema listings on a regular basis the WAP portal cannot modify its structure to better serve this particular user.

Figure 2:
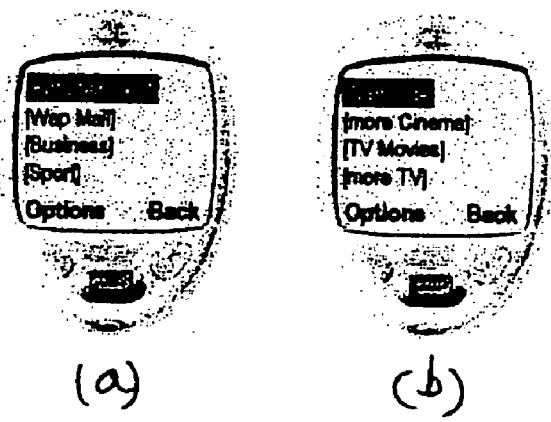

Referring to FIG. 2, given the user's preference for using their WAP phone as a source of cinema listings from the Ormonde, the embodiment now to be described will promote the [Ormonde] menu option to a higher position within the WAP menu structure—for example the top level [Entertainment] option would be promoted from position 7 to within the top 3 positions (that is, the first screen the user sees), FIG. 2(*a*), with the [Ormonde] option promoted to the top of the entertainment menu, FIG. 2(*b*). In the example we also see that the user's preference for movies is reflected in the promoted [TV Movies] option from the TV listings section of the WAP site. Of course, the user can also be given more direct access to other related site sections such as the remaining cinema and TV choice.

Figure 3:
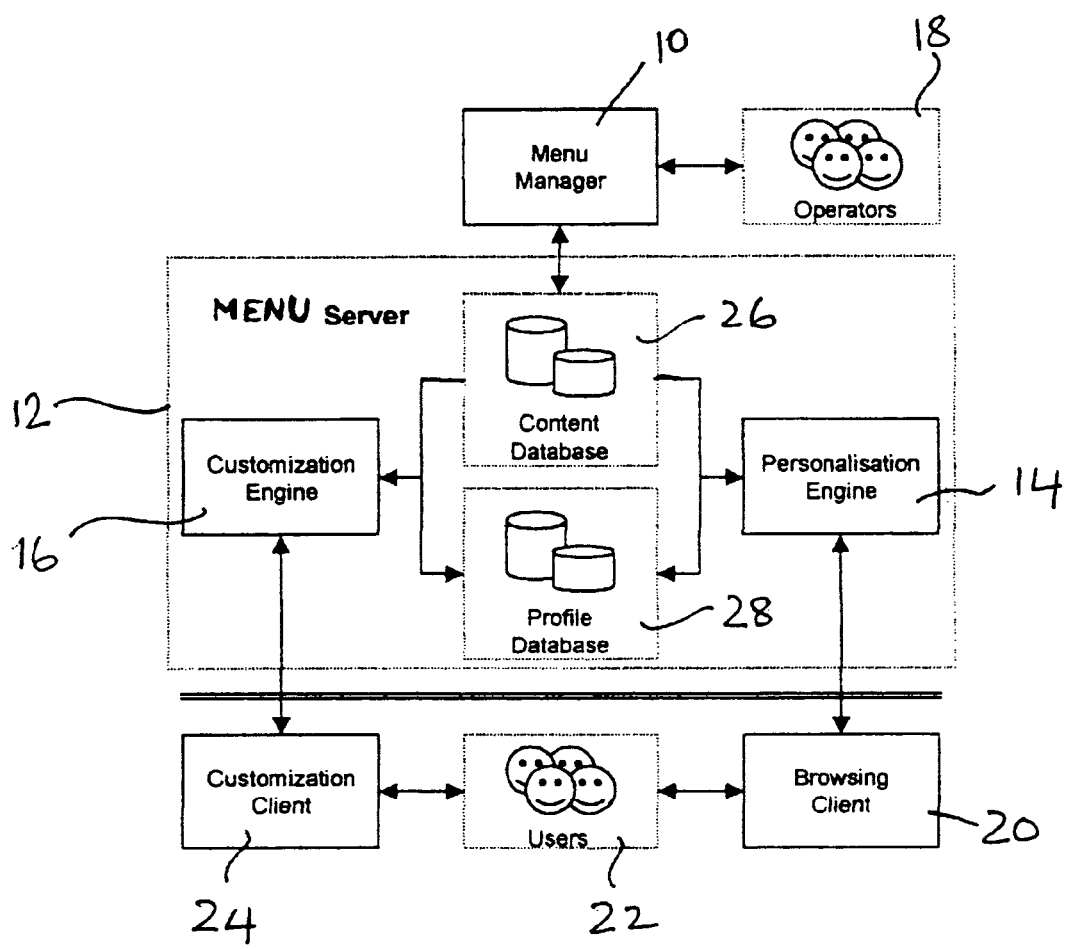
FIG. 3 is a block diagram of the system architecture of a first embodiment of the invention incorporated in a WAP portal.

FIG. 3 is a block diagram of the system architecture of the first embodiment of the invention incorporated in a WAP portal. It will be understood that the full architecture of the portal is not show, only those elements necessary to explain the embodiment. The embodiment comprises a number of different software components including a menu manager 10 and a menu server 12 including a personalisation engine 14 and a customisation engine 16.

The menu manager 10 is a user-facing application designed to allow non-technical staff 18 to rapidly develop, configure, and deploy fully personalised information services, whether WAP- or Web-based. The personalisation engine 14 is a sub-system controlling the generation of personalised menu pages and the profiling of user behaviour. The client 20 is typically a standard Web or WAP browser. The customisation engine 16 is a sub-system providing end-users 22 with a client application to allow them to fully customise parts of the portal in order to fix or override automatic personalisation. The client 24 is typically a standard Web browser.

Typically, the menu manager 10 is used in the following way. An operator 18 first creates and defines the core content and default structure for their portal using menu manager's rapid prototyping facilities (this will be described with reference to FIG. 4). The core content is stored in a content database 26. Second, still using the menu manager 10, the operator defines the basic personalisation properties including the number of menu options to be seen at each level and the sensitivity of the portal to personalisation (this will be described with reference to FIG. 5). Third, the final portal is deployed and made available to the end-users 22.

Once the portal has been published users can manually customise the portal structure by interacting with the customisation engine 16 (this will be described with reference to FIG. 6). Very briefly, this allows end-users to pre-select certain menu options of the portal site and to promote these to higher positions in the site menu structure. For example, a movie fan might specify contained within the top-level menu rather than being hidden in a lower-down menu. In addition, the customisation engine allows users to remove parts of the portal site that are not relevant to their needs, and also allows users to specify that certain regions of the site should not be subject to automatic personalisation. Generally speaking, the customisation engine is made available to the user through a standard Web browser 24 and includes an intuitive graphical user interface to allow them to make these customised changes.

Once the portal has been published the personalisation engine 14 begins to monitor and track each individual user's activity and actively modifies each browsing experience according to that user's browsing history.

This means that each time a user requests a new page through their browser, the menu (navigation) options to be displayed on this page will be calculated in real-time based on default options that have been suggested by the portal operator, and on the suggested options recommended by the personalisation engine 14. In practice, popular menu options (for the user) are promoted to a higher position in the hierarchical menu structure so that these regions of the portal site are more immediately accessible to the user in question.

Considering each of the foregoing components in more detail, the menu manager 10 is a user-facing application with an intuitive GUI interface that allows a non-expert to rapidly design and deploy sophisticated information portals. The user can readily define menu and content pages using drag-and-drop functionality. The menu manager will automatically generate and publish the source files (.wml, .html, .xml) that make up the final portal site and even a large-scale portal can be developed and tested in a matter of hours.

Figure 4:
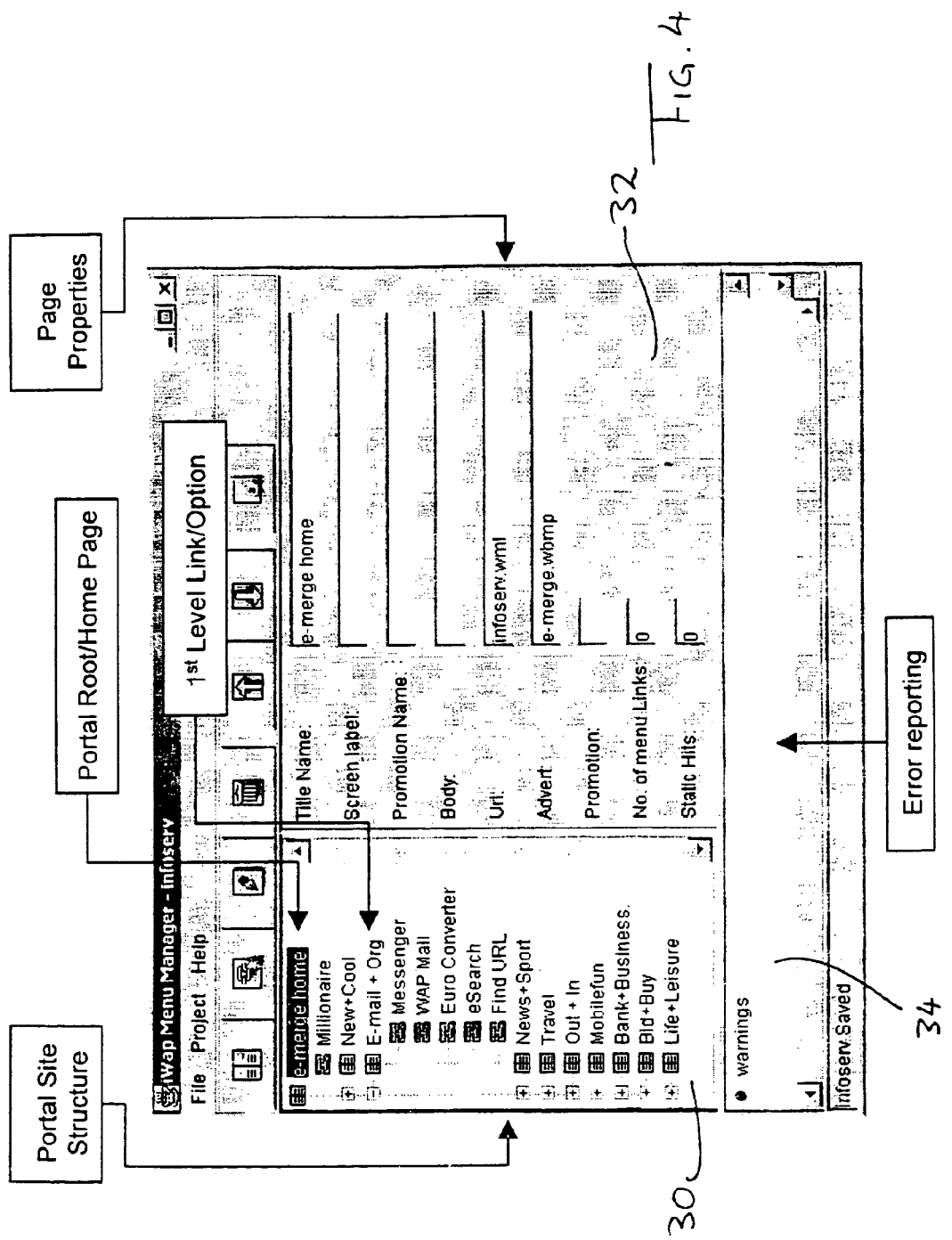
FIG. 4 is a screen shot of the graphical user interface (GUI) to the menu manager of FIG. 3.

A sample screenshot of the menu manager in use is shown in FIG. 4. The main interface is divided into 3 main sections: site structure 30, page properties 32 and error reporting 34. The site structure section 30 allows the operator to define the basic hierarchical menu structure of the portal site using an intuitive tree-based representation and a drag-and-drop style interface, which allows individual pages can be added or deleted or moved to different areas of the site.

FIG. 4 illustrates the construction of one particular portal site rooted at a home page called "e-merge home". The operator has defined a number of different pages including 1st and 2nd level links. For example the "e-merge home" home page contains a link to a menu page titled, "E-mail +Org", which in turns contains links to information pages called "Messenger", "WAP Mail", etc.

As the operator defines the basic site structure he can also specify the detailed properties of each page in section 32, including:

Title name: The page title as it appears in the menu manager.

Screen label: The page title that will appear on the client browser once the portal has been published, if it is different to the title name. Very often title names will be inappropriate for use as screen labels especially if they are derived from some internal page coding scheme as is usually the case.

Promotion name: The operator can specify a separate promotion name for a page, which will be used if the page in question has been promoted out of its default menu position. This allows the operator to provide additional context information for a page, which would otherwise be lost during promotion. For example, consider a page from the TV section of the portal with "Top Pics" as its screen label. The page is designed to list the top TV programmes for a given day, but this is only clear as long as the page remains as a link from the TV page. If this "Top Pics" page is popular with a user then it will be promoted to a higher level and it's meaning will no longer be clear. To solve this problem the operator can specify a promotion name such as "TV: Top Pics".

Body: This property allows the operator to specify a presentation template for the current page in order to control how the page is presented to the end-user.

URL: The URL of the page in question.

Advert: The operator can include a link to an advertising insert which will be included with the page (for Web content) or included before the page (WAP content). A particular benefit of this is that it allows advertising messages to be targeted in the sense that since the operator can associated specific advertisements with relevant menus, these advertisements will be seen more frequently by interested users since these users will have these menus promoted in their personalised menu. For example, RyanAir may purchase advertising space in the travel section of a portal by positioning their advertising banner at the top level travel menu, which typically leads to a whole host of travel related services. The point is that RyanAir want to target people interested in travel since these are more likely to purchase their flights. Ordinarily the RyanAir advertisement and the Travel menu would be statically placed within the site. However, now that the site is personalised, users with an interest in travel will be see the Travel section promoted to a higher place in the menu hierarchy and are more likely to enter the travel part of the site and see the RyanAir advertisement. The ratio of relevant to irrelevant users that view this ad will increases dramatically. In addition the operator can specify certain key personalisation properties for each page in order to control when and how the page is question is personalised. For example, FIG. 5(a) illustrates the creation of a new menu page, FIG. 5(b) the creation of a new link page, and FIG. 5(c) the setting of different personalisation properties for these pages. The "new page" windows shown in FIGS. 5(a) and 5(b) are opened by clicking on appropriate buttons in the menu manager window of FIG. 4, while the "properties" window of FIG. 5(c) is opened by clicking the "Advanced" button in FIG. 5(a) or 5(b). Specifically the following personalisation properties may be set:

Max Links: The maximum number of links that may appear on the menu page concerned (this is obviously not applicable to a link page). This tells the personaliser how many personalised suggestions may be made for a given page. For example, if the page in question has max links set to 8, but already has 5 links specified by the operator, the personaliser can only recommend 3 additional links. Of course, if any of the 5 operator links have themselves been promoted then additional personalised recommendations may be made. This property is especially important for the development of portals that will be viewed using screen-limited devices such as mobile phones, since it allows the operator to guarantee a maximum page size for each page.

Hit Threshold: The hit threshold is a number and is used to indicate the minimum number of hits that a page must receive before it is considered for promotion. The benefit here is that it allows the operator to limit spurious promotion/demotion during the early stages of user activity, when sufficient statistics have not be collected to ensure reliable personalisation. Typically the hit threshold is between 0 and 10 (0 indicates that the page is always available for promotion/demotion).

No Promote: The operator can specify that the page in question should not be promoted as part of personalisation by setting the no promote property.

Copy Promote vs Move Promote—If copy promote is set for a given page, then when this page is promoted it does not disappear from its original menu position. For instance, in the earlier example we considered the promotion of the "Top Pics" page from the TV menu. If copy promote is set for "Top Pics" then, after promotion, the TV menu still contains a link to "TV Pics". If move promote is set, on the other hand, then in that example "Top Pics" would no longer be a link from the TV menu after promotion.

Promotion: The promotion property allows the operator to specify limits on the distance a page may be promoted. For example, setting promotion to 1 means that the page in question may only be promoted to the same level as its parent menu page. Setting promotion to 4 means that the page may be promoted by up to 4 levels if appropriate.

In general then the menu manager 10 allows the operator to rapidly develop and configure a personalised portal. The application includes full project management facilities allowing the operator to develop and manage multiple portals. It also includes an import facility that allows the operator to import an existing portal structure which has been designed using a different portal building package. This features makes it very easy for an operator to re-deploy existing non-personalised portals as fully personalised portals, without having to re-key the portal content. Finally, once the portal has been designed the operator can compile and publish the final content code.

The task of the customisation engine 16 is to provide end-users with the facility to manually customise the portal's menu structure.

The customisation engine is capable of generating a graphical representation of the portal structure for the end-user to manipulate using a standard browser client. The structure is generated to reflect the structure that the user would see while actively using the portal; that is, it takes account of the basic portal structure (operator defined) plus any previous customisations (user specified) plus any current personalised recommendations (as provided by the personalisation engine 14).

The basic customisation operation allows a user to request that a given menu page be moved from its default position within the site to a new position, as indicated by the selection of a new parent menu page. All end-user customisations are stored as part of the user's profile structure in a profile database 28, FIG. 3. Furthermore, all customisations must conform to the configuration settings specified by the operator during the design of the portal. For example, a user cannot move a page into a menu if it violates the maximum number of promotion levels allowed in that page. Also, an operator may specify that certain pages are non-customisable, in which case these pages may not be repositioned.

An example screenshot of the client is shown in FIG. 6(a), which depicts a portion of the main portal site. FIG. 6(b) shows a pop-up window which is activated when the user selects on a portal page (in this case the "FLC Competition" page). This pop-up window allows the user to change the current location of this page. The current location of the page (its default location) is the "New+Cool" menu. The user may select a new location for this page from the selection list in the pop-up window. For example, selecting "e-merge home" would result in the "FLC Competition" link appearing in the "e-merge home" page. Alternatively the user may want to remove the link from his/her view of the portal, which can be achieved by selecting the "Trash" option from the selection list.

The personalisation engine 14 is the heart of the menu server 12. On the face of it the personalisation engine operates in a similar manner to any normal Web server or WAP server: client requests for pages are received and processed and the requested pages are dispatched. However, it is also capable of monitoring online user behaviour and of modifying the structure of the portal menu structure to best suit the learned preferences of individual users. That is, the personalisation engine is capable of restructuring the content portal so that relevant pages for these users appear closer to the home page, but without compromising the consistency of the portal itself. In brief the personalisation engine is responsible for the following functions:

Tracking and profiling online user behaviour. This means monitoring which pages a user requests (which links he selects) and storing this information in their profile where it can be used as a basis for prediction.

Combining online behaviour with user-specified customisations to produce a unified user profile.

Adjusting the menu structure of the portal individually for each user on a per-request basis to account for their profiled preferences. That is, when a user requests a given page, the personalisation engine dynamically selects the links for that page by combining information about the default structure of the page with information learned about the user's preferences and their customisations, to select a set of best links for the page.

The personalisation engine combines a new and efficient method for storing and tracking user behaviour with a unique algorithm for predicting user preferences in terms of where a user is likely to want to go next based on previous browsing behaviour.

The basic profile data structure is the hit table, examples of which are shown in FIGS. 7 to 10 which will be described in more detail below. The hit table relates parent nodes (menu pages) to child nodes (menu pages or link pages) and the number of times that each child has been selected by the user. For example, on the right hand side of FIG. 9, we see that menu page A has been accessed 20 times, the link to page B from A has been accessed 17 times, the link from B to E 3 times, and so on.

In fact the embodiment uses two tables: a static hit table that is initialised with respect to the default portal structure, and a user hit table that records the user's particular history on the portal. The former is shown on the left hand side of each of FIGS. 7 to 10 and the latter on the right hand side.

The static table is defined by the menu manager 10 to reflect the portal structure as specified by the portal operator/designer. It allows the portal to deliver a standard menu structure early on but this will eventually be over-ridden by the personalised menu once the user's history builds up. The hit values that are set in the static hit table make it possible to control the personalisation latency—low values mean that personalisation kicks in very quickly, while large values make the system less sensitive to user activity. In effect, the static hit table is an assumed access history for a first-time new user. As the user browses the portal his selections are used to update the user hit table which is stored as a part of his profile.

The personalisation engine 14 automatically identifies and provides as menu options for a selected menu page m the k most probable links which the user may wish to reach from that menu page, i.e. the k pages with the highest values for $P(n|m)$ based on the current values in the static and user hit tables, subject to any restraints imposed by the site operator (e.g. max links, hit threshold, no promote, etc.) or the user (e.g. non-customisable page). The notation $P(n|m)$ refers to the probability that link n will ultimately be selected by the user given that they are currently in menu m. This is done dynamically, i.e. in real time, when the user selects that menu page and is not pre-calculated. Thus it is not necessary for the personalisation engine to calculate an entire menu structure in advance based on the user's previous browsing history, but to only calculate the portions of the menu which the user wishes to visit at the time he selects the menu page concerned.

When a user selects a new menu m the personalisation engine locates the k most probable links from m and uses these to construct m. These k most probable links will be different for different users according to their browsing history. Typically, some of the k links will have been specified as links from m by the portal operator but others will have been promoted from lower levels. In order to calculate the k most probable links, the personalisation engine computes $P(n|m)$ for each of the links that have appeared as descendants of m in the past by using the static and user hit tables.

To compute $P(X1|X2)$ where X1 is a child of X2 (that is, X1 is a link in X2) we divide the number of hits X1 has received as a child of X2 (the sum of its static and user hit table values) by the number of hits X2 has received.

Generally, if one wishes to compute $P(X1|Xn)$ where X1 and Xn are connected according to the parent-child relationships (X1, X2, . . ., Xn), so that X2 is a parent of X1, X3 is a parent of X2, and so on . . . .

Then $P(X1|Xn)=P(X1|X2)xP(X2|X3)x \ldots xP(Xn-1|Xn)$

Furthermore, suppose X1 also occurs as a child of one of more of X3, . . . Xn, then we compute $P(X1|Xp)$ according to the same method, where Xp is one of X3, . . .,Xn which has X1 as a child and add these probabilities to compute a total probability $P(X1|Xn)$.

We can compute the probabilities of each child node in the normal way, carrying the probabilities from level to level (as child becomes parent) in the obvious way.

The key is to know when to terminate this process. In theory it may seem that to correctly identify the k most probable links for a menu m that the algorithm must examine each node that has every appeared as a descendant of m. This will become very expensive in large menu structures. However a more efficient technique is possible, based on the following observation:

$P(n|m)>=P(\text{child}(n)|m)$ for all children of $n$.

That is, the children of a node n always have lower probabilities relative to a node m than the children of n. Having computed the probabilities associated with the links at a particular level we only need to proceed to the next level via those links that have achieved a probability that is greater than the kth best probability found so far.

This means that we can find the k most probable nodes for menu m and user u by performing a depth-limited breadth-first search over the menu tree rooted at m. The hit tables provide the tree structure information needed to perform the search. That is:

$\text{Children}(m)=\text{StaticHitTable}(m) \cup \text{UserHitTable}(m,u)$

Where StaticHitTable(m) means the nodes indexed under m in the static hit table and UserHitTable(m,u) means the nodes indexed under m in the user hit table for user u.

The following example describes the personalisation process in detail by illustrating how the personalisation progresses over time in terms of a simple menu structure. We assume a hit threshold value of 3 and that each menu page will be constructed to contain 2 links only.

1. New User

Figure 7:
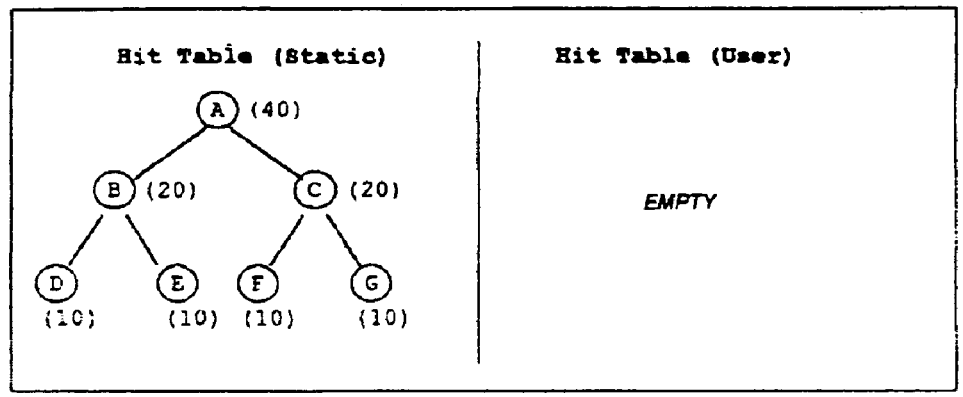
FIGS. 7 to 10 are diagrams explaining the operation of the personalisation engine for a simple menu structure.

FIG. 7 illustrates the situation for a first-time user. The user hit table is empty since no nodes (pages) have been clicked.

Consider the construction of menu page A for the first-time user. The hit tables tell us that there are two direct children, B and C, for node A:

$P(B|A)=(20+0)/(40+0)=20/40=0.5$ $P(C|A)=(20+0)/(40+0)=20/40=0.5$

At this point there is no need to proceed any further because neither B nor C have achieved their hit threshold values of 3 (their user hit table entries are empty indicating a hit value of 0 in each case). Thus links B and C will be used in the menu page A and ordered according to their probabilities (in the case of equal probabilities the ordering is computed with reference to the hit values in the static table).

2. Very Early-Stage User

Figure 8:
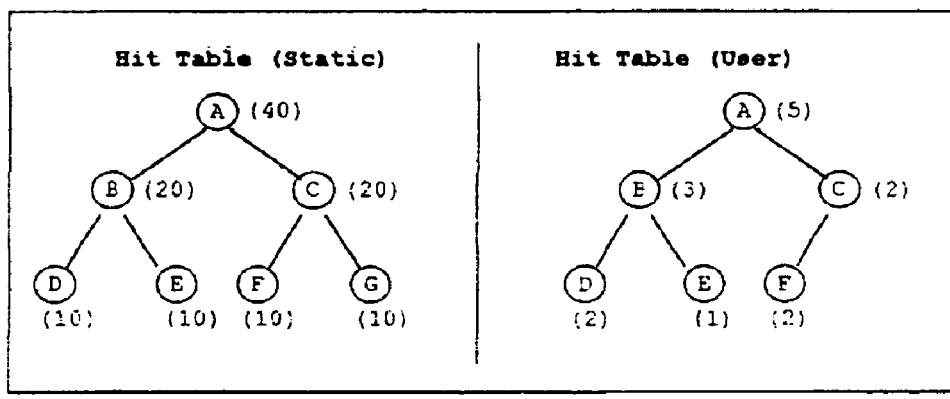

Now consider the situation depicted in FIG. 8. The same user has been using the portal for a very short time and so has built up some initial user hit values. Consider once again the construction of the menu page A. Computing the probabilities for B and C relative to A we find the following:

$P(B|A)=(20+3)/(40+5)=23/45=0.511$ $P(C|A)=(20+2)/(40+5)=22/45=0.488$

Now at this point B has received 3 user hits, achieving the hit threshold value. In addition, because we are looking to identify two links for each menu page we need only expand nodes whose probability is greater than the probability of the second best node probability so far found. This is because, by definition, none of the children or descendant links of a menu option n in menu m can have higher probabilities than n. In this case the second best node probability so far found is 0.488. Since the probability of B is greater (0.511), and because B has achieved its hit threshold, we need to expand B to compute the probabilities of its children. However, we note that none of B's children have achieved their hit thresholds and so they are not available for promotion. Hence, links B and C once again are presented in menu A, with B appearing before C because of its higher probability.

3. Early-Stage User

Figure 9:
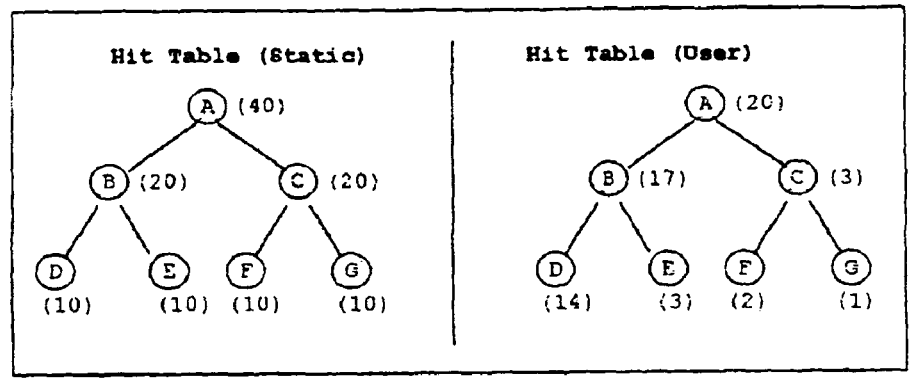

FIG. 9 depicts the situation for the user, still in the very early stages, but where enough usage information has been gathered to begin to find some personalisation effects.

Consider once again the construction of the menu page A. Computing the probabilities for B and C relative to A we find the following:

$$P(B|A)=(20+17)/(40+20)=37/60=0.616$$

$$P(C|A)=(20+3)/(40+20)=23/60=0.383$$

At this point both B and C have achieved their hit thresholds. Since we are looking for 2 links for menu page A we need to expand nodes whose probability exceeds the probability of the second highest probability found so far (that is the probability for C, which is 0.383). Therefore we only need to expand node B (whose probability is 0.616).

Expanding B we compute the probabilities of its children, relative to A:

$$P(D \mid A) = P(D \mid B) \times (P(B \mid A) = (10 + 14)/(20 + 17) \times 0.616$$
$$= 24/37(0.616) = 0.399$$
$$P(E \mid A) = P(E \mid B) \times (P(B \mid A) = (10 + 3)/(20 + 17) \times (0.616$$
$$= 13/37(0.616) = 0.216$$

Now at this point we find that the probability of node D is high enough to make it into the top two nodes overall, overtaking node C. Thus at this stage we can construct menu page A to consist of links to B and D, thus D is promoted to menu A from menu B; again B is presented first with D being second.

It is worth noting at this stage that further rules may dictate which nodes are actually chosen and presented to the user in menu A. For example the network operator may not want static nodes to be deleted for fear that the user would lose access to these menu options. This is viewed as a post-processing task and does not impact on the operation of the personaliser and hence is not at issue here.

4. Mature User

Figure 10:
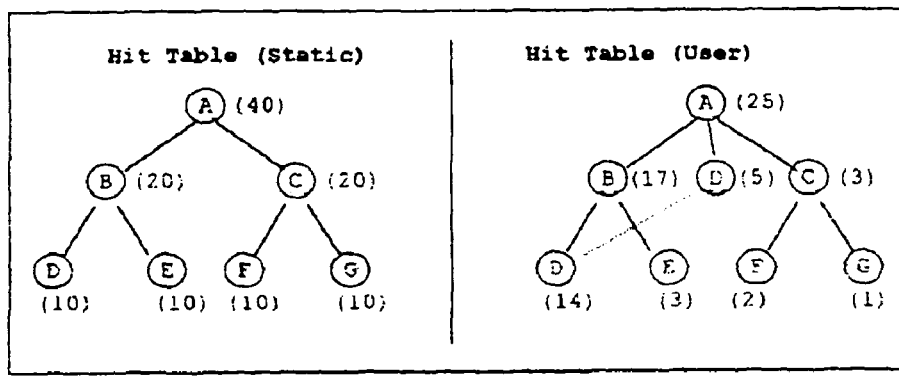

Finally we look at the situation for a mature user where promotion has taken place over time and been acted on by the user. FIG. 10 illustrates the situation: the user has benefited from the promotion of D to menu A and has clicked on this link 5 times in its promoted position as indicated in the user hit table. Note that in FIGS. 7 to 10 the user hit table is simply a record of the user's activity—it does not represent the actual menu structure at the relevant time. For example, in FIG. 10 one might be tempted to interpret the user hit table as indicating that the menu page A has three entries, B, D and C. This is not the case.

Computing menu A for FIG. 10 we get the following probabilities for the children of A (note that now D is a possible child of A):

$$P(B|A)=(20+17)/(40+25)=37/65=0.569$$

$$P(C|A)=(20+3)/(40+25)=23/65=0.353$$

$$P(D|A)=(0+5)/(40+25)=5/65=0.076$$

We expand B further because it is the only node whose probability exceeds the worst acceptable probability so far found (0.353, the probability for C).

Expanding B we compute the probabilities of its children, relative to A:

$$P(D \mid A) = P(D \mid B) \times (P(B \mid A) + 0.076$$
$$= (10 + 14)/(20 + 17) \times (0.569) + 0.076$$
$$= 24/37(0.569) + 0.076 = 0.444$$
$$P(E \mid A) = P(E \mid B) \times P(B \mid A) = (10 + 3)/(20 + 17) \times (0.569)$$
$$= 13/37(0.569) = 0.199$$

The important thing to note here is that in computing the probability for node D we consider its probability relative to B (its static parent) and its probability relative to A (its promoted parent), by adding the appropriate probabilities.

In general, as nodes are promoted and demoted over time they will generate multiple entries in the user hit table and in computing probabilities we always take the sum of the probabilities for a given node over its multiple ancestral entries—by ancestral we mean that we only sum probabilities for entries of the node that appear higher up in the menu structure than our current computation point. Hence, when we are computing the probability for D relative to A (at A) we do not consider the second entry for D relative to B since is it below A. But when we come to compute the probability of D relative to A (at B) then we take account of both probabilities.

So now the best two probabilities found so far are 0.589 and 0.444, which correspond to nodes B and D respectively. Once again these nodes can be chosen for menu A and ordered according to their probabilities.

Although the foregoing has described only a very simple menu structure, the invention is applicable to menu structures having many levels and page promotion can occur up through many level as their probabilities build up over time. The general algorithm is attached at Appendix A.

As it stands the above algorithm defaults to a copy-promote scheme—promoting node D from menu B to menu A does not mean that the user will not see D in B if they select C.

Consider the example described in FIG. 10 where menu A is displayed with links to D and B. Now suppose that the user selects menu B (the original parent of D). In a move-promote scheme, even if D is in the top k nodes from B it should not be displayed because it has already been seen by the user in an ancestral menu (in this case the parent menu, but it could just have easily been a grandparent menu etc.). Under the present scheme D would be repeated as a child of B.

If we do wish to implement a move-promote scheme we need two new tables on a session-by-session basis to track promotions and demotions during that session. The sounds complicated but is actually very simple. One table manages the parent-child relationships (and is a simpler version of the user hit table). The other captures the inverse child-parent relationships. During each session we build these tables according to the nodes that are selected for each personalised menu.

Consider the example in FIG. 10 once again, and suppose that the user has just accessed menu A with its two links, D and B. The user's current child-parent and parent-child tables will contain the information shown in FIG. 11.

Now, when it comes to building menu B we can test if a given node n has already been seen by the user in an ancestral menu by recursively backtracking up the menu tree, by following the child-parent relationships from the child-parent table and then checking the children at each level from the parent-child table.

For example, first we would follow the parent of B (if there are multiple parents we can arrange it so that the most recent parent is listed first in the parent-child table). The check to see if n is an element of the children of this parent (by using the parent-child table). Given that even exponentially large menu trees have linear depths, this is a very cheap operation especially since a single user session is like to focus on a small part of the menu structure.

Various modifications and refinements of the above embodiment are possible. For example, it is possible to specify that a page is promoted only if its probability exceeds a certain threshold, say 0.4, even though it may be in the top k pages according to the probability calculations.

It is also possible to provide a sensitivity attribute to a node. The sensitivity of a node indicates how sensitive it is to personalisation. A low sensitivity value means that the node is relatively insensitive to personalisation and so will move slowly. The converse is true for a node with a high sensitivity value. This is controlled in practice by using the sensitivity value as the increment when a given node is selected. For example, if a node has a sensitivity value of 3 then each time it is selected 3 is added to its current total in the appropriate entry in the hit table. One complication with this scheme is that potentially the hit value of a parent node may no longer be the sum of the hit values of its children (if children have sensitivity values different from the parent). For this reason a simple normalisation process is used to ensure that the hit values of child nodes sum to equal the hit values of the parent node. Very briefly the parent's hit values are distributed among the child nodes according to the ratios of actual child hit values. Sensitivity is essentially a way of weighting the probabilities of the nodes.

In summary, the embodiment of the invention comprises an application that allows users to rapidly develop and deploy personalised information services—that is, information services that automatically modify to the needs of individual users based on their online behaviour patterns. The constructed portal is capable of fully modifying to the navigation preferences of individual online users and of ultimately delivering a more efficient and enjoyable mobile experience to these users.

The embodiment allows users to benefit from a shorter "click-distance" to their preferred content. The embodiment provides these benefits by allowing the WAP portal to modify dynamically to the access patterns of an individual user in order to proactively predict that user's likely (and common) information need and so promote the information target to a more accessible position within the WAP portal menu structure.

Figure 12:
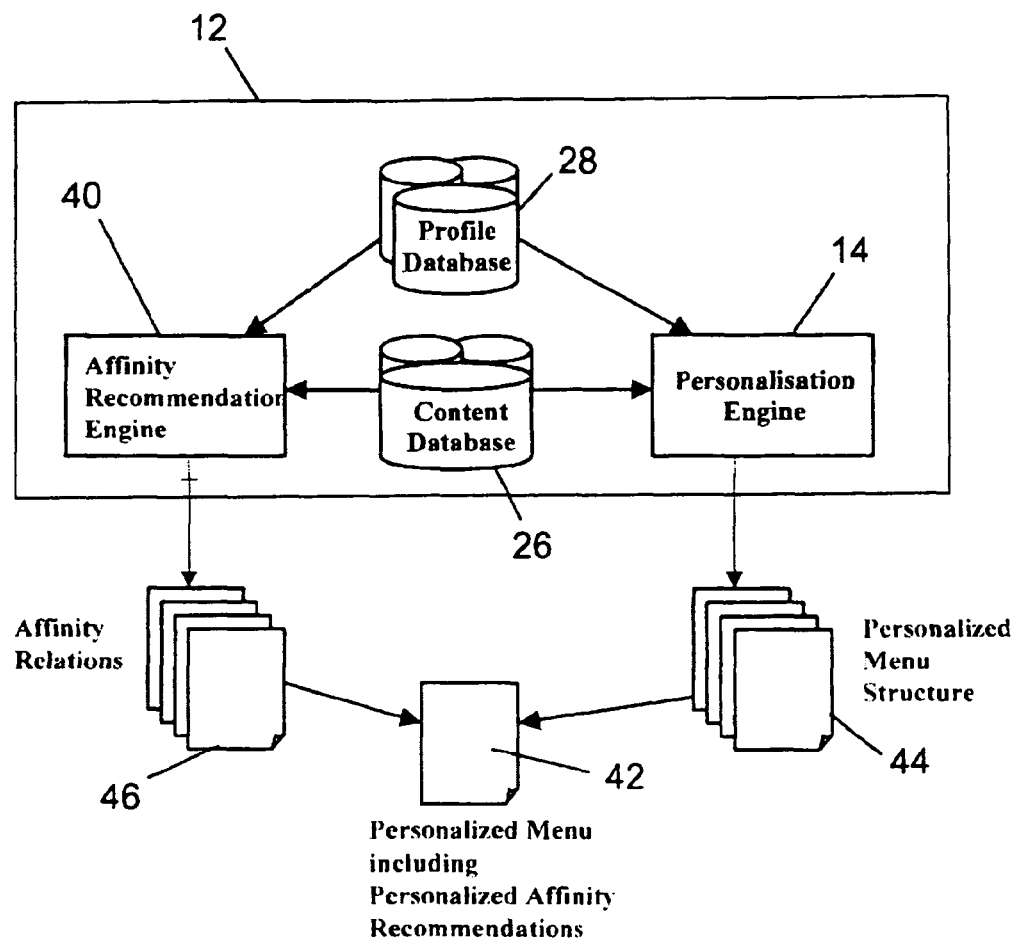
FIG. 12 is a block diagram of a second embodiment of the invention.

Referring now to FIG. 12, a second embodiment of the invention retains the personalisation functionality of the first embodiments described above, but adds further function based on what is referred to herein as an affinity recommendation technique. For simplicity, in FIG. 12 the customisation engine 16 is omitted in the view of the menu server 12, as are the menu manager 10, browsing client 20 and customisation client 24. However, all are present and operate as described above. As compared to the first embodiment the embodiment of FIG. 12 includes an affinity recommendation engine 40 which operates as follows.

With the affinity recommendations technique, menu options are recognized as being comparable to each other if they both receive a number of clicks from the same set of users. The concept is that if the same set of users are interested in both menu options then there is a high probability that the menu options are possibly related to individual users in similar ways. This differs from existing collaborative filtering techniques in that it incorporates similarity between menu options that are not necessarily conceptually similar. For example, an affinity recommendation technique may identify a high similarity between a technology news menu option and a TV listings menu option even though there is no direct similarity between the content they lead to. This similarity value means that a group of users who view technology news also view TV listings so they have a similar interest in both these topics.

The affinity recommendation engine 40 works on the basis of user navigation patterns. Essentially this navigation occurs across menu options in a mobile portal and the users' navigation patterns are used to cluster menu options together.

The first step in the affinity recommendation technique is to note what users have clicked on each of the menu options. This done by making an initial pass through the user hit tables and building an inverted index keyed by menu options. Each of these menu options has a list of associated profiles that contain these menu options and the number of times they have been clicked by the owners of the profiles. As the number of users increases it becomes infeasible to store this inverted index in memory. Therefore each entry in the inverted index is be stored in a separate file. For each menu option a file is created with each line in the file containing the name of a profile and the number of times that menu option has been clicked by the owner of the profile.

For example, the file for the menu option M1 may contain the data shown in FIG. 13, which means User1 clicked M1 10 times, User6 clicked M1 50 times, and so on. In order to reduce the number and size of these files the following threshold values can be used:

Hit threshold—when building up a file for a menu option such as M1 only include those users whose click value for M1 meets or exceeds the hit threshold. The hit threshold is a predefined number which represents the lower limit on the number of clicks a menu option must receive from a user before the user's profile is deemed useful in computing the affinity values for this menu option.

User threshold—if the number of users added to the file associated with the menu option exceed the user threshold stop adding users to the file. These files may be removed altogether so they don't take part in the affinity recommendation. The reason for removing them is that the menu option is a very common menu so may not provide additional benefits in the affinity recommendation process as it is already high up in most users' personalized menu structure.

When updating the inverted index files, only those hit tables within user profiles that have been accessed since the previous update are examined. If the profiles have not been accessed then the number of clicks associated with hit tables in the profiles will not have changed. As a result the profiles will have no affect on the files that are being updated.

In order to recommend menu options that are similar to other menu options a method for computing the similarity between menu options is needed. This uses the association of profiles to menu options. Consider the similarity between two menu options M1 and M2, FIG. 14. M1 has been clicked by User1, User3, User5, User10 and User11 and M2 has been clicked by User1, User4, User5, User11, and User20. To compute the similarity between M1 and M2 we only need to consider the number of hits given to each menu option by the users that have clicked on both (i.e. User1, User5 and User11).

The similarity between M1 and M2 can be computed using Pearson's Correlation Coefficient, which returns a value between −1 and +1. The higher the value the more similar the menus are and vice versa. The following example shows the similarity computation between menus M1 and M2 in FIG. 14. The resulting similarity is 0.266 which suggests the menus are not very similar.

Pearson's Correlation Coefficient:

$$r = \frac{\Sigma XY - \frac{\Sigma X \Sigma Y}{N}}{\sqrt{\left(\Sigma X^2 - \frac{(\Sigma X)^2}{N}\right)\left(\Sigma Y^2 - \frac{(\Sigma Y)^2}{N}\right)}}$$

If we consider the example above the similarity is computed as follows. The values of X in the equation are assigned those associated with menu option M1 and the values of Y are assigned the values associated with menu option M2, FIG. 15.

Taken step by step:
$\Sigma XY = (10 \times 5) + (20 \times 16) + (15 \times 45) = 1045$
$\Sigma X = 10 + 20 + 15 = 45$
$\Sigma Y = 5 + 16 + 45 = 66$
$\Sigma X^2 = 100 + 400 + 225 = 725$
$\Sigma Y^2 = 25 + 256 + 2025 = 2306$
$(\Sigma X)^2 = 2025$
$(\Sigma Y)^2 = 4356$
$N = 3$ Similarity=0.266

When computing the similarity between menu options an "overlap threshold" is needed. This threshold represents the minimum number of users needed to have clicked on both menu options before Pearson's Correlation Coefficient (or any other similarity technique) can be used to measure the affinity between menu options. Any number lower than this threshold would suggest the menu options might not be similar, as very few users have selected both menu options.

In the above example Pearson's Correlation Coefficient is used to compute the similarity between the menu options. However, this is only one possible technique for computing a similarity measure. Any well-defined similarity metric can be used to measure the similarity between menu options.

The affinity recommendation engine 40 constructs affinity files which are used to maintain the relationship (i.e. the affinity) among menu options. There will be an affinity file for each menu option, which contains a list of other menu options and the relationship between them and the owner of the affinity file. For example, the content of the affinity file for M1 may look like FIG. 16, which means M1 and M2 have a similarity value of 0.266, etc.

Figure 17:
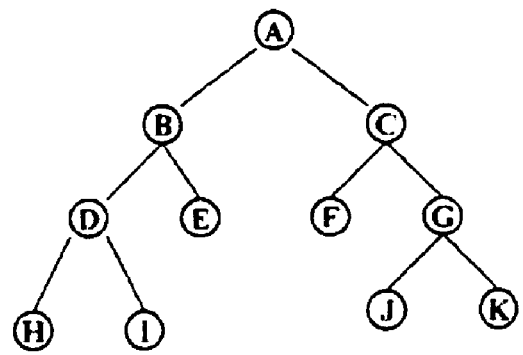

As with the index files, the size of the affinity files may be limited in various ways:

1. Partners—only consider the partners of a menu option for inclusion in the affinity files. There are a variety of methods for selecting the partners of a particular menu option. For example, and referring to FIG. 17, the partners of menu option B can be:

The descendents (D, E, H, I) of the menu option.
All nodes in the menu structure, except those (D, E, H and I) that are descendents of the menu option.
The siblings (c) and the descendents (D, E, H, I) of the menu option.
Every menu option that is a leaf node (i.e. a link to an external content provider) and a non-descendent of the menu (F, J, K). This will ensure that only leaf nodes from other areas of the menu structure may be recommended along with the menu option. These are recommended because they may be menu options the user has not seen before but may be of interest and because of its similarity to the user's current menu option.
All other menu options in the menu structure.
Any combination of nodes in the menu structure.

In the foregoing, the menu structure from which the partners are selected is, of course, the default menu structure for the user, since the personalised menu is only built dynamically as the user clicks through it. However, the affinity recommendation technique is not dependent, and is usable independently of, the personalisation technique described in relation to the first embodiment, and in that case the menu structure from which the partners are defined is just the menu structure of the site.

2. Affinity threshold—only include those menu options that have a similarity value above a certain threshold, i.e. the affinity threshold. The reason for this is to ensure that only menu options that are sufficiently similar to a menu option may be recommended along with that menu option.

Figure 18:
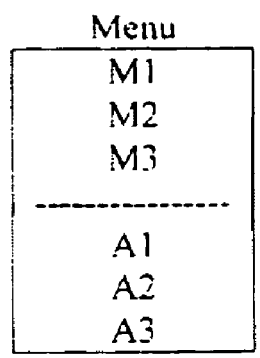

Affinity recommendations can be combined with any menu structure to provide personalized recommendations. For any menu option there is the potential for recommending any other menu option that is sufficiently (i.e. above the specified affinity threshold) similar. When, as in the present embodiment, the affinity recommendations are combined with the menu options built using the probability model, the simplest approach is to build a personalized menu (based on the probability model) and then include a separate list of personalized affinity recommendations as shown in FIG. 18, where M=menu options based on probability model, A=affinity recommendations.

The site operator can predefine the number of recommendations. To produce a list of personalized affinity recommendations an affinity source is identified. The affinity source is the menu or list of menus that are used in producing the affinity recommendations. An affinity recommendation score is also used which represents the likelihood of a menu option to appear as an affinity recommendation. This score may be simply the affinity value associated with the menu option or may be some combination of probability and affinity values. The following describes a number of techniques for selecting the affinity recommendations to appear on a selected menu page.

Consider a menu page, M, with three menu options, M1, M2 and M3. The task is to produce a list of k affinity recommendations to appear on M. The following describes a number of techniques that may be used to select the affinity recommendations. Note: Methods A and B use the affinity value as the affinity recommendations score.

A. Use M as the Affinity Source.

The simplest approach would be to use M as the source for the affinity recommendations. The list of affinity relations for the menu page M are ordered in decreasing order of affinity value and the menu options associated with the top k relations are used as the affinity recommendations.

B. Use M1, M2 and M3 as the Affinity Source.

With this approach the top k affinity relations for M1, M2 and M3 are combined. This combination of relations is in turn ordered by affinity value and the top k' are selected as the affinity recommendations.

Union(Affinity(M1, M2, M3))={$A_1^{M1} \ldots A_k^{M1}, A_1^{M2} \ldots A_k^{M2}, A_1^{M3} \ldots A_k^{M3}$} where $A_1^{M1}$ is the menu with the highest affinity relation to M1 and so on.

Affinity Recommendation=the top k menu options from the above set with the highest affinity value.

C. Use M1, M2 and M3 as the Affinity Source but Vary the Affinity Recommendations Score.

This method is similar to (B) except it incorporates probability information from the affinity source when selecting the k best affinity recommendations. For each of the top k affinity relations associated with M1, M2 and M3 an affinity recommendations score is computed using the following equation:

$$Score(A_1^{M1}) = Probability(M1) * Affinity(A_1^{M1}, M1)$$

Where the Probability(M1) is the probability of M1 appearing on the menu page M (based on the probability model). Affinity ($A_1^{M1}$, M1) is the affinity relation (i.e. the similarity) between M1 and the affinity recommendation $A_1^{M1}$.

The possible affinity relations are then ordered in decreasing order of affinity score and the top k are used as the affinity recommendations. Note: In the above equation the score is based on the product of the probability and affinity values. other combinations may be used to compute score.

D. Use Various Combinations of M1, M2 and M3.

The techniques described in B and C above can be used on various combinations of M1, M2 and M3 such as:

Those menu options from M1 to M3 that are part of the default menu page M.

Those menu options from M1 to M3 that are not part of the default menu page M but have been promoted to the menu page M using the probability model.

Those menu options from M1 to M3 that are not part of the dynamic menu page M but have been customized by a user to the menu page M.

Note: Affinity recommendations selected using method A or using the default menus as the affinity source will be the same for all users. However, with the other techniques described the affinity recommendations appearing on a particular menu page M are personalized, so the menu options selected as recommendations may vary from person to person.

The end result, therefore, is a personalised menu 42, FIG. 12, consisting of the personalised menu structure 44 produced by the probability calculation and including in addition the affinity recommendations 46.

The invention is not limited to the embodiments described herein which may be modified or varied without departing from the scope of the invention.

APPENDIX A

```
Personalize(userSession, parentNode, k)
{
    expand = true
    staticChildren ¬the static children of the parentNode
    clickedChildren ¬nodes clicked by user from this parentNode
    if (clickedChildren is empty)
        possibleNodes ¬staticChildren
    else
        possibleNodes ¬clickedChildren Ė staticChildren
    possibleNodes ¬possibleNodes - nodes hidden by user
    possibleNodes ¬possible Nodes -
    nodes customised by user to a different level
    if (project implements move promote)
        possibleNodes ¬possible Nodes -
    nodes promoted to a different level
    compute probabilities of possibleNodes
    sort possibleNodes in descending order of probability
    while (expand is true) {
        expand ¬false
        kBestNodes ¬the k nodes in possibleNodes
        with highest probability
        kthMostProbableNode ¬kth most probable
        node in the possibleNodes
        kthProbabilityValue ¬the probability
        of the kthMostProbableNode
        For each of the kBestNodes {
            if (expand is false) {
                currentNode ¬next node in kBestNodes
                if (node has not being expanded before and node is a
                menu node) {
                    staticChildren ¬the static children of currentNode
                    clickedChildren ¬nodes clicked by user from currentNode
                    if (clickedChildren is empty)
                        possibleNodes ¬possibleNodes Ė staticChildren
                    else
                        possibleNodes ¬possibleNodes Ė
                    (clickedChildren Ė staticChildren
                        if (project implements move promote)
                    possibleNodes ¬possibleNodes -
                    nodes promoted to a different level
                    possibleNodes ¬possibleNodes - nodes hidden by user
                    possibleNodes ¬possibleNodes -
                    nodes customised by user to a different parent
                        compute probabilies of possibleNodes
                    sort possibleNodes in descending order of probability
                    expand ¬true
                }
            }
        }
    }
}
```

The invention claimed is:

1. A system including a computer-readable storage medium having instructions recorded thereon which are executable in a computer, comprising:
a user selection record particular to each user of a website which records, for a number of different users, a number of times various menu options from a default menu structure of the website have been selected by each of the different users,
a group navigation record which records a measurement of a correlation between different menu options determined as a function of the number of times each menu option has been selected by different users that have selected both, as recorded by the user selection record particular to each user of the website; and
wherein the system is operable such that provided, as at least one additional menu option for a particular menu page of the website, is at least one link which is correlated with, as determined by a navigation pattern measurement recorded in a user group navigation pattern record, at least one menu option present on the particular menu page other than through the navigation pattern measurement, whereby the system is operable such that a hierarchical menu structure presented via the website is modified to include the additional menu option on the particular menu page of the website.

2. The system as claimed in claim 1, wherein a user's selection of a particular menu option is taken into account in the navigation pattern measurement only if the number of times that user has selected that menu option reaches a predetermined threshold.

3. The system as claimed in claim 1, wherein a menu option is not considered for provision as an additional menu option if a number of users selecting it exceeds a predetermined threshold.

4. The system as claimed in claim 1, wherein the navigation pattern measurement is made on two menu options only if each menu option has been selected by a predetermined minimum number of users.

5. A computer-implemented method for execution in a computer comprising:

maintaining a user selection record particular to each user of a website which records, for a number of different users, a number of times various menu options from a default menu structure of the website have been selected by each of the different users;

maintaining a group navigation record which records a measurement of a correlation between different menu options determined as a function of the number of times each menu option has been selected by users that have selected both, as recorded by the user selection record particular to each user of the website; and automatically modifying a default menu structure for each user over time by providing, as at least one additional menu option for a particular menu page of the website, at least one link which is correlated with, as determined by a navigation pattern measurement as recorded in a user group navigation pattern record, at least one menu option present on the particular menu page other than through the navigation pattern measurement whereby a hierarchical menu structure is modified to include the additional menu option on the particular menu page of the website.

6. A computer-readable storage medium having recorded thereon instructions which, when executed in a computer having control of an internet website which presents a hierarchical menu structure to users, cause the computer to:

maintain a user selection record particular to each user of a website which records, for a number of different users, a number of times various menu options from a default menu structure of the website have been selected by each of the different users;

maintain a group navigation record which records a measurement of a correlation between different menu options determined as a function of the number of times each menu option has been selected by users that have selected both, as determined by the user selection record particular to each user of the website; and automatically modify a default menu structure for each user over time by providing, as at least one additional menu option for a particular menu page of the website, at least one link which is correlated with, as determined by a navigation pattern measurement, at least one menu option present on the particular menu page other than through the navigation pattern measurement whereby the instructions, when executed in the computer, are operable such that a hierarchical menu structure is modified to include the additional menu option on the particular menu page.

* * * * *